US007016996B1

(12) United States Patent
Schober

(10) Patent No.: US 7,016,996 B1
(45) Date of Patent: Mar. 21, 2006

(54) METHOD AND APPARATUS TO DETECT A TIMEOUT CONDITION FOR A DATA ITEM WITHIN A PROCESS

(76) Inventor: Richard L. Schober, 10139 Ridgeway Dr., Cupertino, CA (US) 95014

( * ) Notice: Subject to any disclaimer, the term of this patent is extended or adjusted under 35 U.S.C. 154(b) by 843 days.

(21) Appl. No.: 10/123,553

(22) Filed: Apr. 15, 2002

(51) Int. Cl.
G06F 13/362 (2006.01)
G06F 9/46 (2006.01)

(52) U.S. Cl. ...................................... 710/113; 718/102
(58) Field of Classification Search ..................... None
See application file for complete search history.

(56) References Cited

U.S. PATENT DOCUMENTS

| | | | | |
|---|---|---|---|---|
| 5,018,089 | A | * | 5/1991 | Kanazawa .................... 703/16 |
| 5,398,333 | A | * | 3/1995 | Schieve et al. ............... 714/36 |
| 5,615,161 | A | | 3/1997 | Mu |
| 5,634,008 | A | * | 5/1997 | Gaffaney et al. ........... 709/224 |
| 5,644,604 | A | | 7/1997 | Larson |
| 5,740,346 | A | | 4/1998 | Wicki et al. |
| 5,768,300 | A | | 6/1998 | Sastry et al. |
| 5,778,201 | A | * | 7/1998 | Scalise ....................... 710/305 |
| 5,838,684 | A | | 11/1998 | Wicki et al. |
| 5,892,766 | A | | 4/1999 | Wicki et al. |
| 5,931,967 | A | | 8/1999 | Shimizu et al. |
| 5,959,995 | A | | 9/1999 | Wicki et al. |
| 5,987,629 | A | | 11/1999 | Sastry et al. |
| 5,991,296 | A | | 11/1999 | Mu et al. |
| 6,003,064 | A | | 12/1999 | Wicki et al. |
| 6,411,622 | B1 | * | 6/2002 | Ohgane ................... 370/395.1 |
| 2001/0023392 | A1 | * | 9/2001 | Nakatsuhama et al. ..... 702/120 |

OTHER PUBLICATIONS

InfiniBand Architecture Specification, General Specification vol. 1, Oct 24, 2000, Final, 880 Pages.
"InfiniBand Switch Chip Runs at 10 Gbps On Eight Ports", Nicholas Cravotta, Nov. 8, 2001, EDN, 1 page.
"Assemble Fast Switch Fabrics With 32-Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Ascierto, EE Times, Oct. 23, 2001, 3 pages.
"Switch Chip Expands InfiniBand Integration", EEM File 3130, Tony Chance, 2 pages.
"RedSwitch Announces 16 Gbyte/s Throughout Switch Product for RapidIO Architecture", RedSwitch Press Release, Milpitas, Calif., May 15, 2001, Tony Chance,May 15, 2001 , 2 pages.

* cited by examiner

Primary Examiner—Rehana Perveen
Assistant Examiner—Jeremy S. Cerullo

(57) ABSTRACT

A method for detecting a timeout condition for a data item (e.g., a request) within the process (e.g., within an arbitration process) includes maintaining a current time as a first N-bit binary number (A). An event time of an occurrence of an event pertaining to the data item within the process is recorded and stored as a second N-bit binary number (B). A predetermined time limit, expressed as a non-negative integer K, is configured. K is less than N and K is a logarithm base 2 of the predetermined time limit. A timeout condition pertaining to the data item is detected when a difference between the current time and the event time exceeds the predetermined time limit. The detection of the timeout condition is performed utilizing a single-stage operation. This single stage operation may include computing A (current time)−B (event time) modulo $2^n \geq 2^k$.

29 Claims, 14 Drawing Sheets

US 7,016,996 B1

METHOD AND APPARATUS TO DETECT A TIMEOUT CONDITION FOR A DATA ITEM WITHIN A PROCESS

FIELD OF THE INVENTION

The present invention relates generally to the field of data item processing and, more specifically, to detecting a timeout condition for a data items (e.g., a transfer request) within a process (e.g., an arbitration process between competing transfer requests).

BACKGROUND OF THE INVENTION

The detection of timeout conditions within data processes is typically performed to break deadlocks that may have occurred, and to avoid the dedication of resources of a data process to a particular data item to the exclusion of other data items. Timeout conditions are detected in a wide variety of data processing applications and devices. Such data processing applications may be implemented in software, hardware, or some combination thereof (i.e., firmware). Exemplary environments in which a deadlock (or stall) of a data process with respect to data item may be detrimental are instruction execution (i.e., software execution) and a networking (or interconnect) environment. For example, a deadlock during software execution may cause a computer system to "hang". In summary, a deadlock or stall during processing of the network traffic may cause a severe degradation of network performance. Within both instruction execution and network traffic processing environments, there are a multitude of situations in which requests compete for specific resources.

Consider for example a new interconnect technology, called the InfiniBand™, that has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnects of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration processing is typically employed to arbitrate between competing requests, associated with packets received at the input ports of the switching device, for device resources. An arbitration process to arbitrate between competing requests is an example of the process within which a stall or deadlock may severely degrade network performance. Accordingly, the IBA specification provides a number of timeout requirements (e.g., transmission and service timeout requirements).

Arbitration processes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come, first-serve policy, a shortest message first policy or a priority based policy, to name but a few.

As mentioned above, the IBA specification requires detection a number of timeout conditions (e.g., transmission timeouts and service timeouts). The detection of a number of timeout conditions within an arbitration process may also be desirable from a performance enhancement viewpoint. Nonetheless, the detection of timeout conditions does consume system resources, and it is desirable to minimize the impact of such timeout detection operations on overall system performance. For example, it is desirable to minimize the time dedicated to performing such timeout detection operations.

SUMMARY OF THE INVENTION

According to one aspect of the present invention, a method and system to detect a timeout condition for a data item within a process include maintaining a current time as a first N-bit binary number (A). An event time of an occurrence of an event pertaining to the data item within the process is recorded and stored as a second N-bit binary number (B). A predetermined time limit, expressed as a non-negative integer K, is configured. K is less than N and K is a logarithm base 2 of the predetermined time limit. A timeout condition pertaining to the data item is detected when a difference between the current time and the event time exceeds the predetermined time limit. The detection of the timeout condition is performed utilizing a single-stage operation.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to detect a timeout condition for a data item within a process are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any data processing device or architecture (e.g., a general-purpose microprocessor, an application specific integrated circuit (ASIC), floating point gate array (FPGA), or other data processing circuit).

Figure 1:
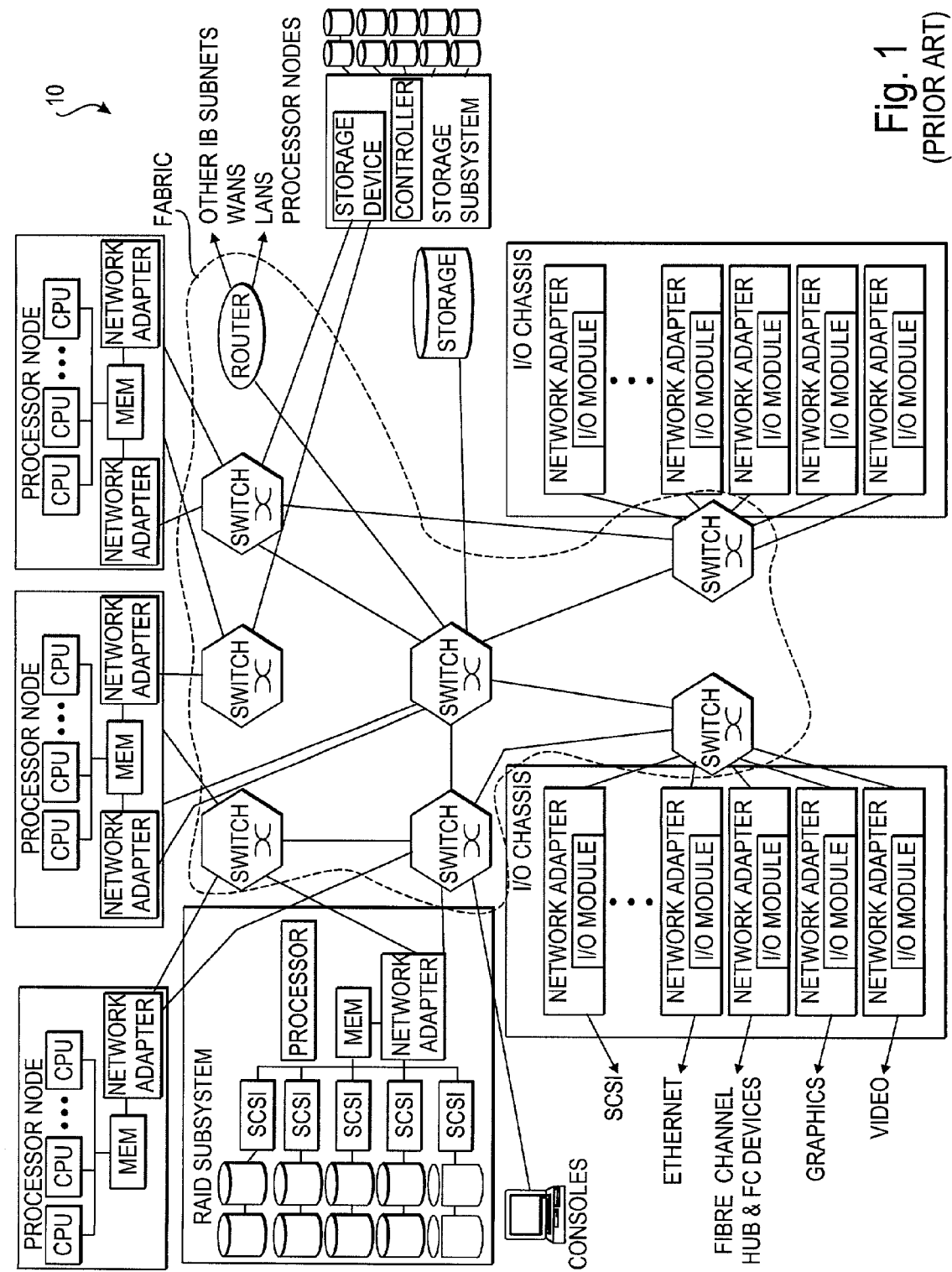
FIG. 1 is a diagrammatic representation of a System Area Network, according to the prior art, as supported by a switch fabric.
Figure 2A:
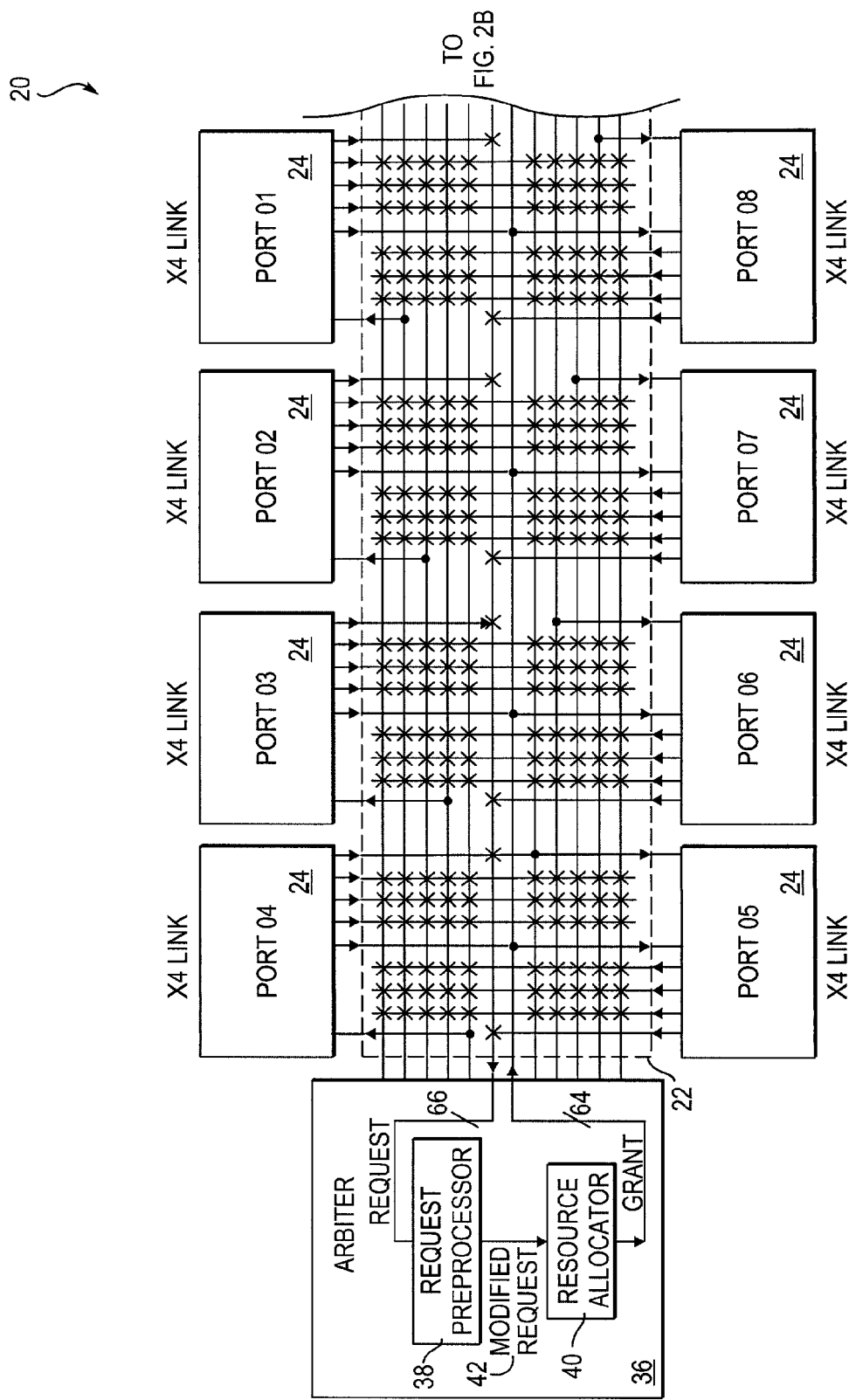
FIGS. 2A and 2B provide a diagrammatic representation of a datapath, according to an exemplary embodiment of the present invention, implemented within an interconnect device (e.g., a switch).
Figure 2B:
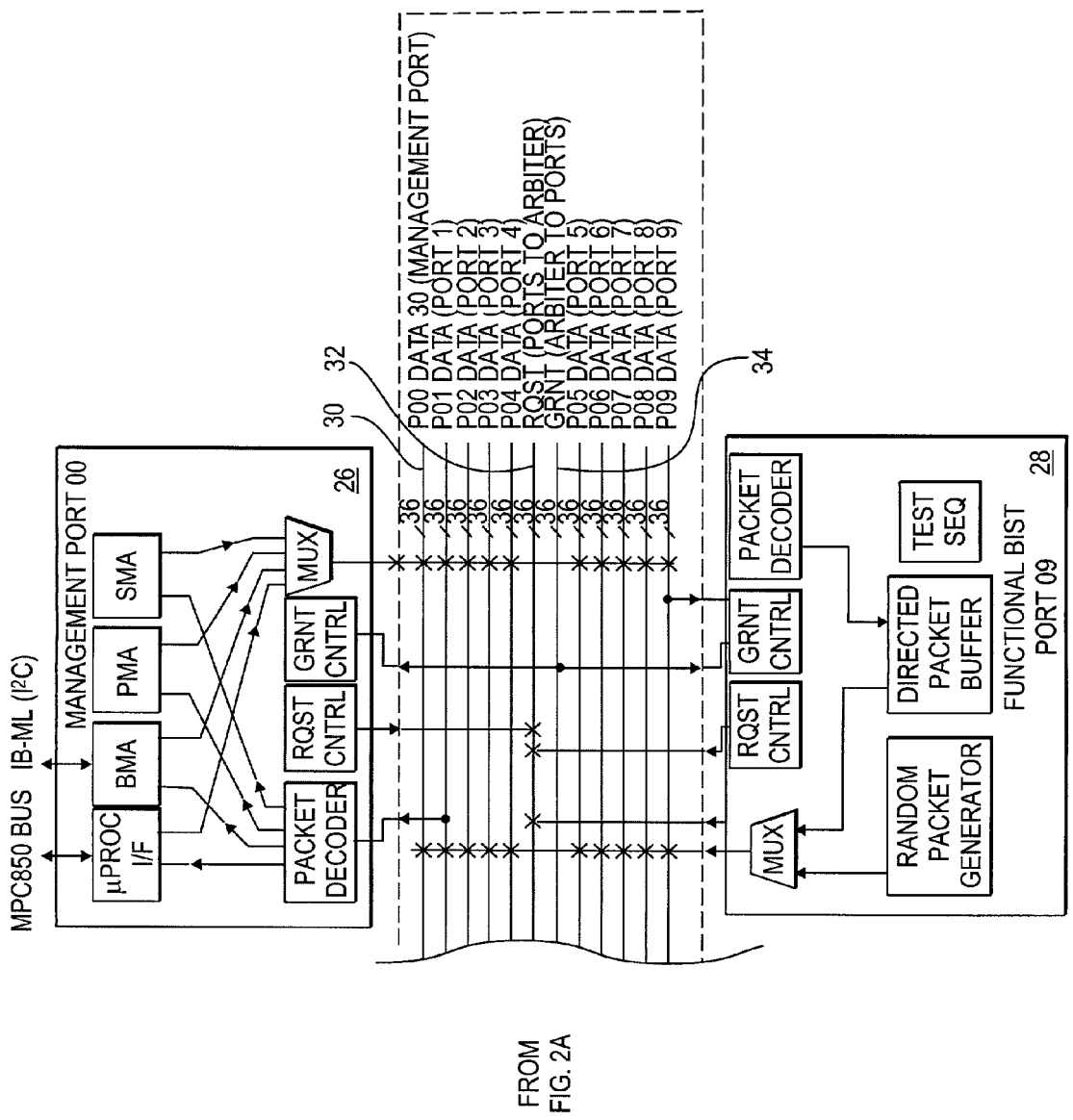

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar 22 are eight communications ports 24 that issue resource requests to an arbiter 36 via the request bus 32, and that receive resource grants from the arbiter 36 via the grant bus 34.

The arbiter 36 includes a request preprocessor 38 to receive resource requests from the request bus 32 and to generate a data item in the exemplary form of a modified resource request 42 to a resource allocator 40. The resource allocator 40 then issues a resource grant on the grant bus 34.

In addition to the eight communications ports, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device embodying the datapath 20. The functional BIST port 28 includes a random packet generator, a directed packet buffer and a return packet checker.

Figure 3:
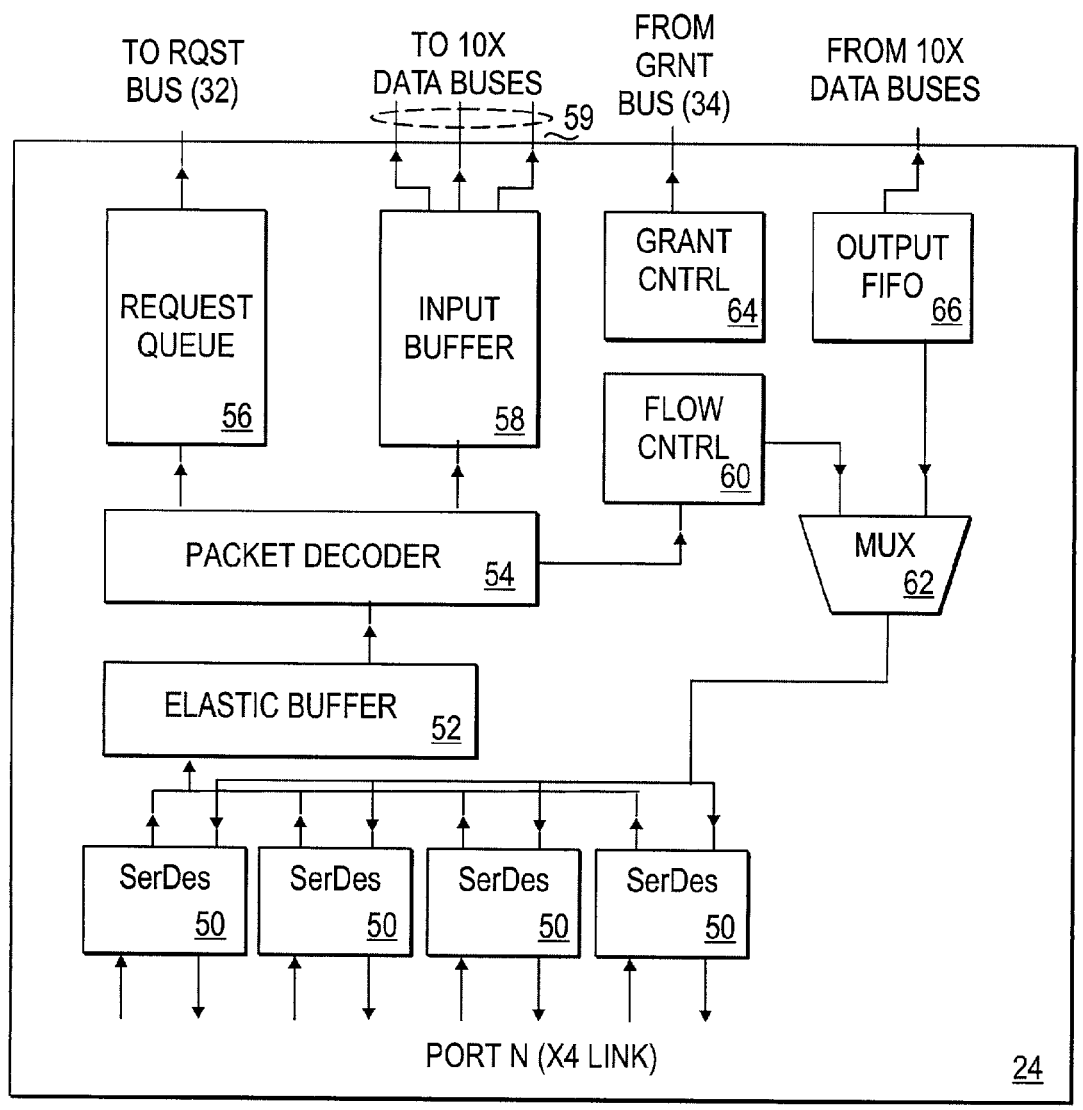
FIG. 3 is a diagrammatic representation of a communications port, according to an exemplary embodiment of the present invention, which may be employed within a datapath.

Turning now to the communications ports 24, FIG. 3 is a block diagram providing further architectural details of an exemplary communications port 24 as may be implemented within the datapath 20. While the datapath 20 of FIGS. 2A and 2B is shown to include eight×4 duplex communications ports 24, the present invention is not limited to such a configuration. Referring specifically to FIG. 3, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the SerDes's 50 at the port 24 is communicated as a 32-bit word to an elastic buffer 52. The elastic buffer 52 has two primary functions, namely:

(1) To accommodate frequency differences (within a specified tolerance) between clocks recovered from an incoming bit stream and a clock local to the datapath 20; and (2) To accommodate skew between symbols being received at the datapath 20 on four serial data channels.

Incoming data is further synchronized with a core clock as it is propagated through the elastic buffer 52. The core clock may be generated by an on-chip phase-locked loop (PLL) circuit and distributed by a clock distribution network that minimizes clock skew between sequential logic elements.

Figure 4:
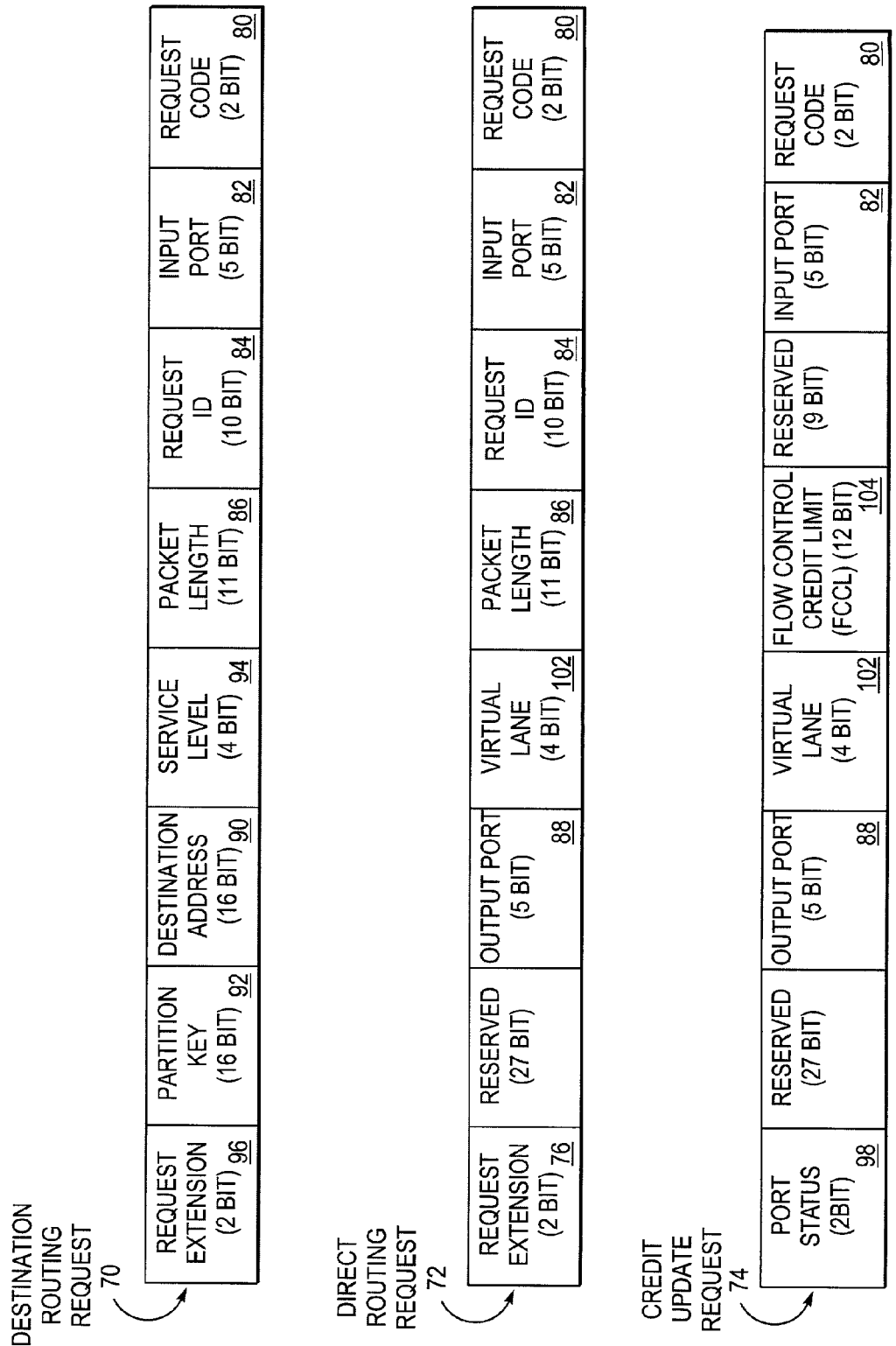
FIG. 4 illustrates exemplary packet transfer requests and an exemplary credit update request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 4 illustrates two examples of packet transfer requests, namely a destination routing request 70 and a direct routing request 72. An exemplary credit update request 74 is also shown.

Return to FIG. 3, each communications port 24 is also shown to include a 20 Kbyte input buffer 58, the capacity of which is divided equally among data virtual lanes (VLs) supported by the datapath 20. Virtual lanes are, in one embodiment, independent data streams that are supported by a common physical link. Further details regarding the concept of "virtual lanes" are provided in the InfiniBand™ Architecture Specification, Volume 1, Oct. 24, 2000.

The input buffer 58 of each port 24 is organized into 64-byte blocks, and a packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the SerDes 50 to other ports 24. Further details regarding an exemplary credit-based flow control are provided in the InfiniBand™ Architecture Specification, Volume 1.

Figure 7:
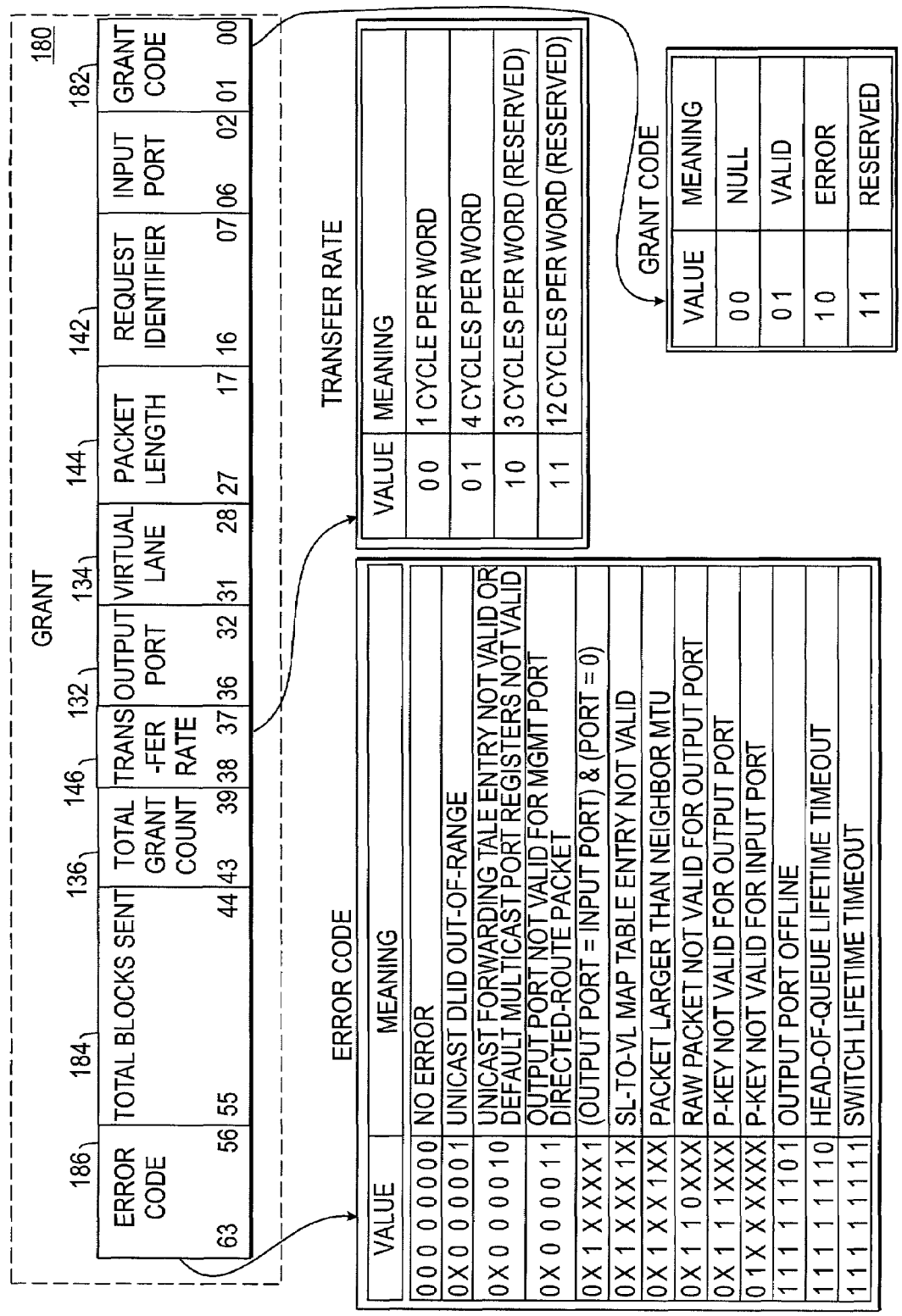
FIG. 7 illustrates an exemplary grant that may be issued responsive to any one of the requests discussed in the present application.

The communications port 24 also includes a grant controller 64 to receive resource grants 180 from the arbiter 36 via the grant bus 34. FIG. 7 provides an example of a grant 180.

An output FIFO 66 has sufficient capacity to hold a maximum-sized packet, according to a communications protocol supported by the datapath 20. The output FIFO 66 provides elasticity for the insertion of inter-frame symbols, and flow control messages, between packets. The output FIFO 66 furthermore provides speed matching for moving packets from ×4 to ×1 ports.

Returning to FIG. 4, within the routing requests 70 and 72, a request code 80 identifies the request type, an input port identifier 82 identifies a port 24 from which the request was issued, and a request identifier 84 is a "handle" or identifier for a request that allows the grant controller 64 of a port to associate a grant 180 with a specific packet. For example, the request identifier 84 may be a pointer to a location within the input buffer 58 of a communications port 24. The request identifier 84 is necessary as a particular port 24 may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packets should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15), a raw (e.g., non-Infiniband) packet, or a standard packet where the partition key is valid/invalid.

The exemplary credit update request 74 includes a port status identifier 98 that indicates whether an associated port, identified by the port identifier 100, is online and, if so, the link width (e.g., 12×, 4× or 1×). Each credit update request 74 also includes a virtual lane identifier 102 and a flow control credit limit 104.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

To compute the number of available credits, the resource allocator 40 subtracts the total number of blocks sent on the relevant virtual lane (modulo 4096). This computation counts packets that have been sent after the remote receiver sent a flow control message, thus making the credit forwarding mechanism tolerant of link delays. The effective computation is:

Available Credits=Reported Credits−(value of total blocks sent−remote value of total blocks received).

Arbiter

Figure 5:
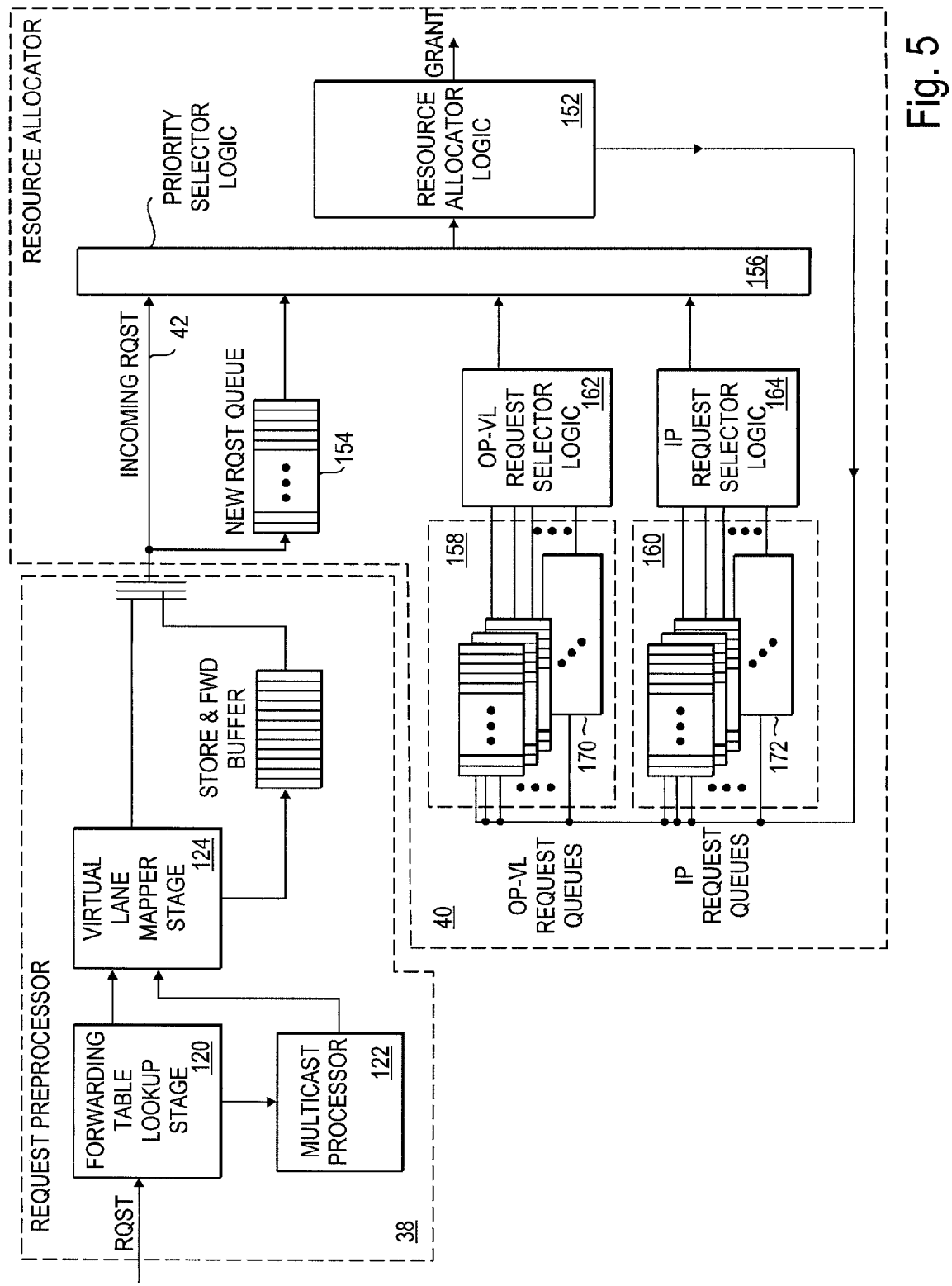
FIG. 5 is a block diagram illustrating the conceptual architecture of an arbiter, according to an exemplary embodiment of the present invention.

FIG. 5 is a conceptual block diagram of the arbiter 36, according to an exemplary embodiment of the present invention that implements a process in the exemplary form of an arbitration process. While the present invention is described within the context of this arbitration process, the present invention is not limited to such process, and may find application in any process.

The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allows efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request (e.g., a destination routing, direct routing or credit update request 70, 72 or 74) is received on the request bus 32 at a forwarding table lookup stage 120 that includes both unicast and multicast forwarding tables (not shown). Specifically, a packet's destination address 90 is utilized to perform a lookup on both the unicast and multicast forwarding tables. If the destination address is for a unicast address, the destination address 90 is translated to an output port number. On the other hand, if the destination is for a multicast group, a multicast processor 122 spawns multiple unicast requests based on a lookup in the multicast forwarding table.

From the forwarding table lookup stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier.

Figure 6:
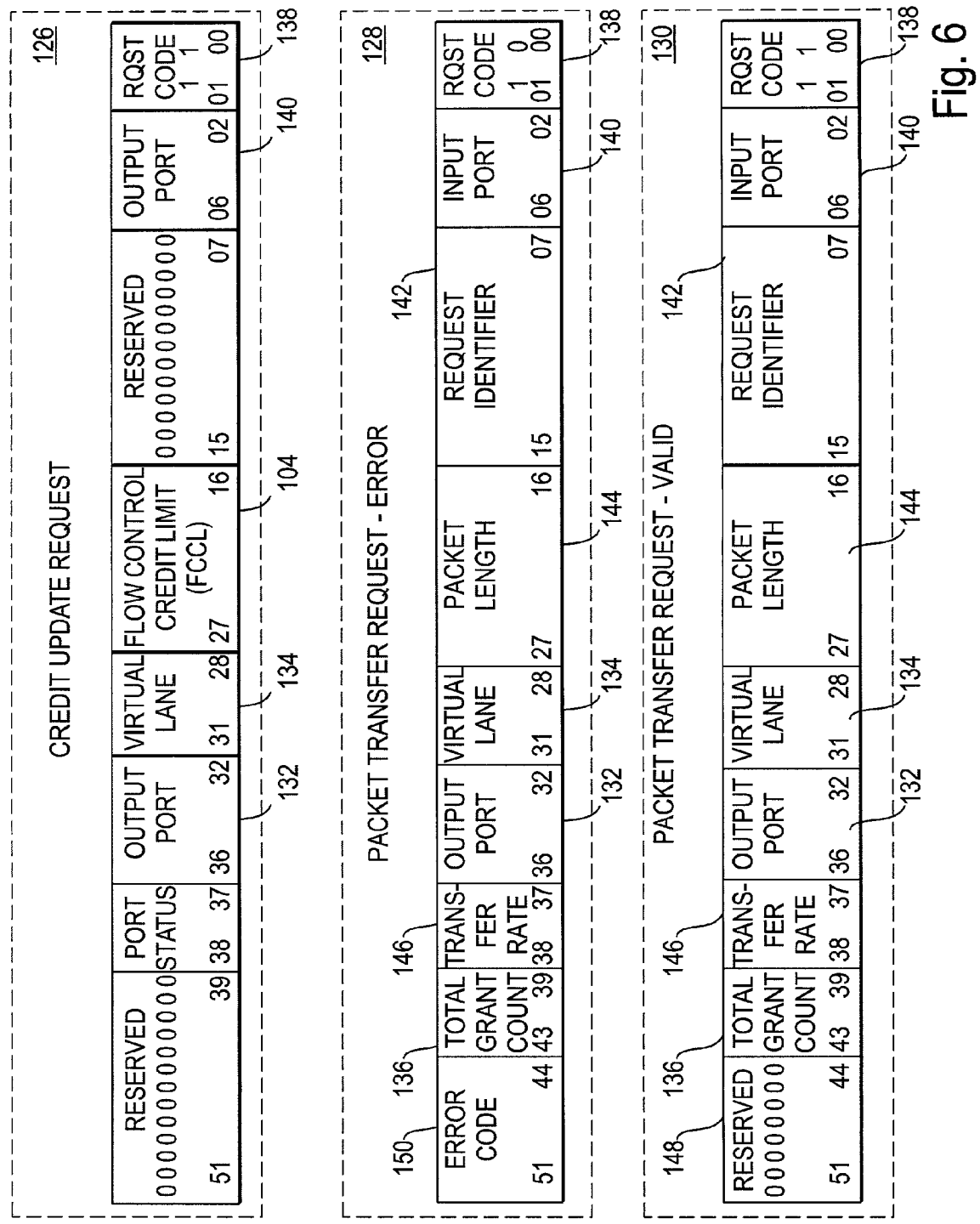
FIG. 6 provides representations of exemplary modified resource requests that may be outputted from a request preprocessor to a request allocator of the arbiter illustrated in FIG. 5.

Accordingly, the output of the request preprocessor 38 is a modified request that is derived from a request, such as any of those shown in FIG. 4. FIG. 6 is a diagrammatic representation of exemplary modified resource requests 42 that may be outputted from the request preprocessor 38 to the resource allocator 40. Taking a valid packet transfer request 130 as an example, it will be noted that this request 130 includes an output port identifier 132 generated at the forwarding table lookup stage 120 and a virtual lane identifier 134 generated at the virtual lane mapper stage 124.

A total grant count value 136 is also included within the request 130. The total grant count value 136 is generated at the forwarding table lookup stage 120, and is utilized to track multicast requests.

Other fields within the valid packet transfer request 130 include a request code 138 that identifies a request type and input port identifier 140 that identifies the port 24 from which the request originated, a request identifier 142 that uniquely identifies the request, a packet length value 144 that indicates the number of 4-byte words within a packet, a transfer rate value 146 that identifies the speed at which the packet will be sent through the crossbar 22 of the datapath 20 and a reserved field 148.

The error packet transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 4.

Returning to FIG. 2, a modified incoming request (e.g., a modified resource request 42 such as any of the requests 126, 128 or 130) is received at the resource allocator 40 from the request preprocessor 38. An incoming (or just-arrived) modified request 42 may proceed directly to resource allocator logic 152, if there is no contention with further pending requests stored in a new request queue 154 that are awaiting processing by the resource allocator logic 152. If such contention does exist, an incoming modified request 42 is placed at the back of the new request queue 154.

As stated above, FIG. 5 is a conceptual diagram of the arbiter 36, and the various queues and selectors described herein may not be physically implemented as discrete components or logic blocks. For example, the request queues discussed are, in one embodiment, each implemented as link lists within a single pending request buffer. Nonetheless, for a conceptual understanding of the present invention, it is useful to make reference to FIG. 5.

The resource allocator 40 is shown to include priority selector logic 156 that implements a priority scheme to feed resource requests from one of four sources to the resource allocator logic 152. The four sources from which the priority selector logic 156 selects a resource request are: (1) an incoming request 312; (2) the new request queue 154; (3) a group 158 of output port-virtual lane (OP-VL) request queues 170; and (4) a group 160 of input port (IP) request queues 172. The group 158 of output port-virtual lane (OP-VL) request queues 170 has output port-virtual lane (OP-VL) request selector logic 162 associated therewith for performing a selection of requests from within the group 158 of queues for presentation to the priority selector logic 156. Similarly, the group 160 of input port (IP) request queues has input port request selector logic 164 associated therewith to select a request for presentation to the priority selector logic 156. It will be noted that two levels of selection logic are employed for these groups of queues. A first level of selection logic is employed to select requests from a group 158 or 160 of queues associated with a first resource type (e.g., output port-virtual lane combinations), each queue being associated with a specific instance of the resource type. A second level of selection logic is employed to select between requests that emerge from each group of queues based on a priority scheme.

At a high level, the arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier 134 of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and then request is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a target output port before an input read buffer port is committed by the resource allocator logic 152. Accordingly, once a virtual lane and target output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues. As flow control credits and output ports become available, the selector logic 162 chooses among pending requests in the group 158 of queues. In an exemplary embodiment of the present invention where the arbiter 36 supports the InfiniBand™ Architecture, the output port-virtual lane request selector logic 162 may implement the InfiniBand VL arbitration scheme.

Similarly, the input port request selector logic 164 monitors each of the input port (IP) request queues 172 within the group 160 as input buffers 58 become available. The selector logic 164 chooses among pending requests utilizing, for example, a simple round-robin selection policy.

Upon the availability of all resources required to satisfy a particular request, the resource allocator logic 152 will issue a grant 180, on the grant bus 34. FIG. 7 illustrates the content of an exemplary grant 180. The grant 180 contains a number of fields in common with a request, as well as an additional grant code 182, a total blocks sent field 184, and an error code field 186.

Figure 8:
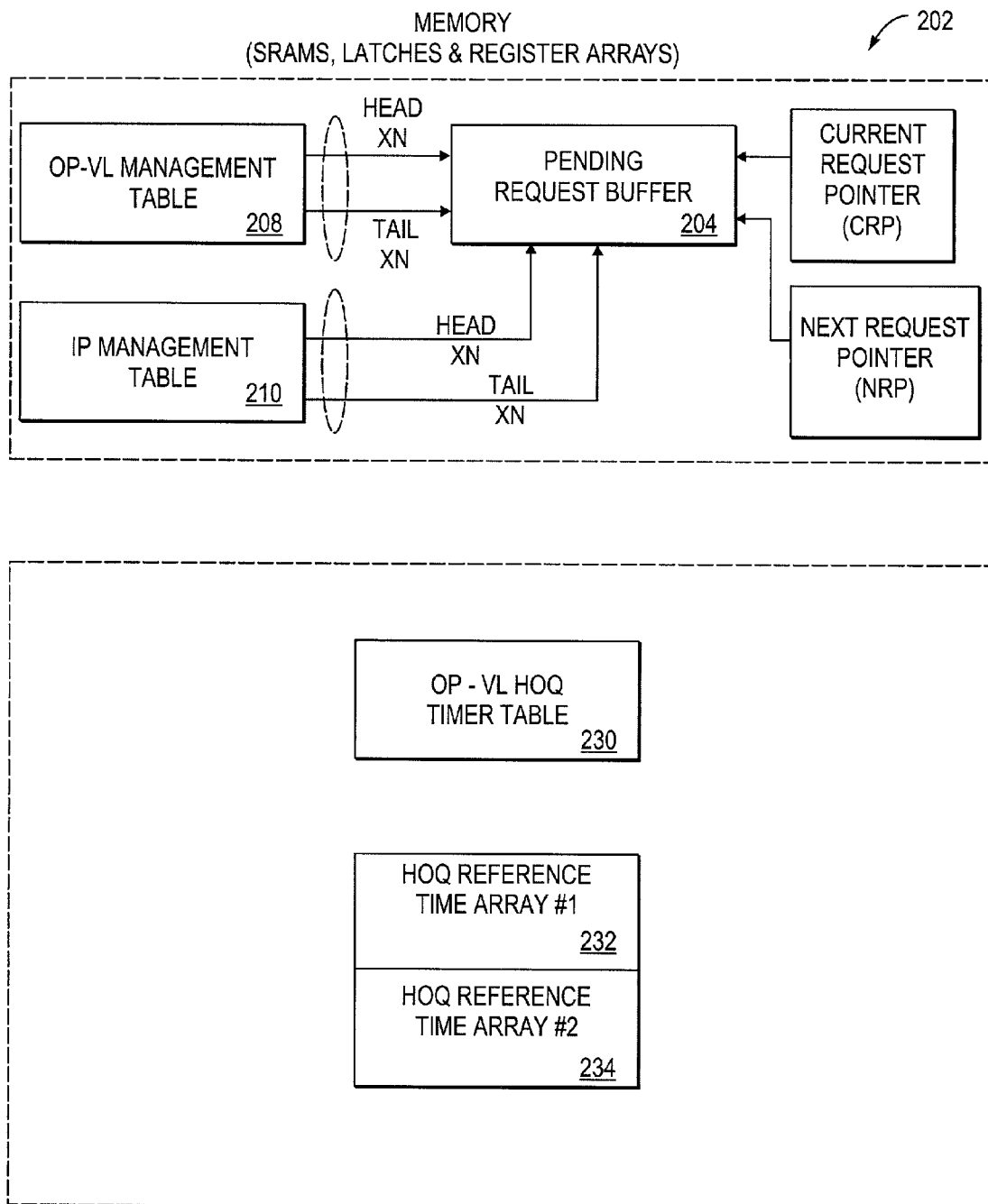
FIG. 8 is a block diagram illustrating exemplary data structures that may be maintained within a memory (e.g., a RAM) associated with an interconnect device.

As stated above, FIG. 5 provides a conceptual diagram of the various request queues that may be maintained in the arbiter 36. FIG. 8 is a block diagram illustrating exemplary data structures that may be maintained within a memory 202 (e.g., a collection of Random Access Memories (RAMs) and registers) associated with an interconnect device. At a high level, all requests received at the resource allocator 40 from the request preprocessor 38 are stored within a pending request buffer 204 until grant. In one embodiment, the pending request buffer 204 maintains multiple groups of queues, each group of queues being dedicated to a specific resource type. Accordingly, each group of queues is constituted by queues associated with a specific instance of a relevant resource type (e.g., ports, virtual lanes, etc.). In the exemplary embodiment, the pending request buffer 204 stores the group 158 of output port-virtual lane (OP-VL) request queues 170, the group 160 of input port (IP) request queues 172, the new request queue 154 and a free list. Each queue within the pending request buffer 204 is furthermore maintained as a link list, in that each entry includes a pointer to at least a next (or preceding) entry of the relevant queue.

Figure 9:
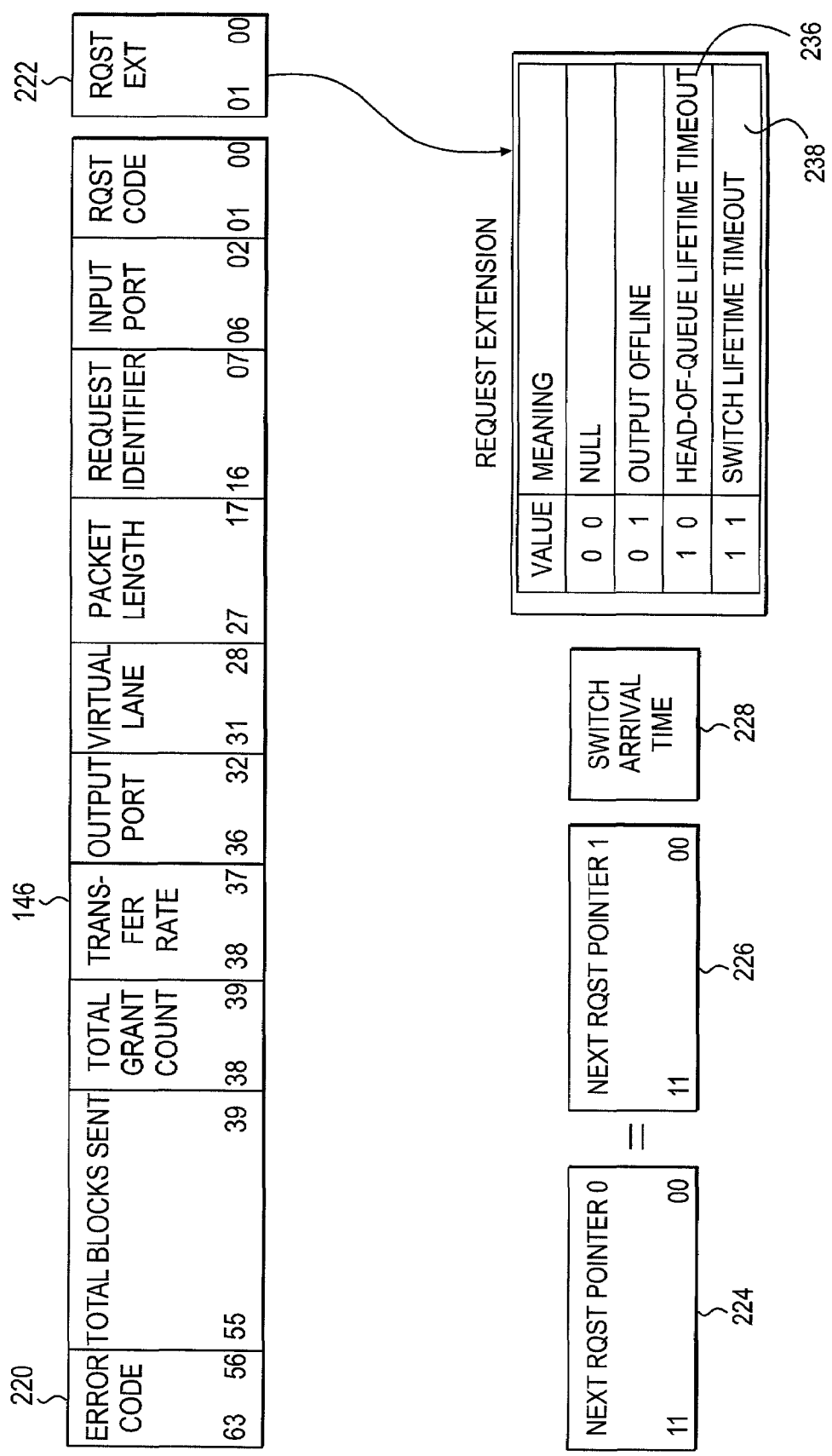
FIG. 9 is a field diagram illustrating fields that may be implemented within each entry within the pending request buffer, according to an exemplary embodiment of the present invention.

FIG. 9 is a field diagram illustrating fields that may be implemented within each entry within the pending request buffer 204, according to an exemplary embodiment of the present invention. It should be noted that the pending request buffer 204 holds all requests received at the resource allocator 40 and may include 1024 entries to support the datapath 20, when employed in an InfiniBand compliant environment. However, it will be appreciated that where a number of ports and the deployment environment vary, the number of entries may be varied accordingly.

The fields of the pending request buffer 204 illustrated in FIG. 9 are divided into four banks, namely: (1) a request bank 220; (2) a request extension bank 222; (3) a next request pointer 0 bank 224; and (4) a next request pointer 1 bank 226. The request bank 220 stores the content of each request as received from the request preprocessor 38, the request extension bank 222 stores codes for errors detected by the resource allocator 40 (e.g., a head to-of-queue lifetime timeout 236 and a switch lifetime timeout 238), the next request pointer 0 bank is utilized for reading a next entry in a relevant request queue (e.g., an OP-VL, an IP or the new request queue), and the next request pointer 1 bank 226 is utilized for reading a next entry in a free list.

The request bank 220 includes a switch arrival time 228 that records a switch arrival time value for a request. The switch arrival time value indicates a time at which the relevant request arrived (or was received) at the resource allocator 40.

Returning to FIG. 8, a number of tables for managing the queues maintained within the pending request buffer 204 are shown to be implemented within the memory 202. Specifically an output port-virtual lane (OP-VL) management table 208 maintains a head and tail pointer for each of the OP-VL request queues 170 of the group 158, and an input port (IP) management table 210 stores head and tail pointers for each of the IP request queues 172 of the group 160.

FIG. 8 also illustrates that the memory 202 maintains an OP-VL head-of-queue (HOQ) timer table 230 that holds event times in the exemplary form of (1) a switch arrival time (i.e., the time at which a request was received at the resource allocator 40 of the arbiter 36) and (2) a head-of-queue arrival time (i.e., the time at which a request progressed to the head of an OP-VL request queue 170) for each request within each OP-VL request queue 170. The OP-VL HOQ timer table 230 also tracks the virtual lane stalls. The content of an exemplary entry within the OP-VL HOQ timer table 230 is provided below in Table 1:

TABLE 1

| Bit Range | Size (bits) | Field Name/Description |
|---|---|---|
| 23:12 | 12 | Switch Arrival Time |
| 11:05 | 7 | Head-of-Queue Arrival Time (when the Arrival Times Valid bit is set) or Stall Begin Time (when Stalled bit is set) |
| 04 | 1 | Arrival Times Valid bit (Indicates that the two arrival time fields are valid) |
| 03 | 1 | Stalled |
| 02:00 | 3 | Drop Count (The number of sequential packets dropped because of a head-of-queue timeout) |

Figure 10:
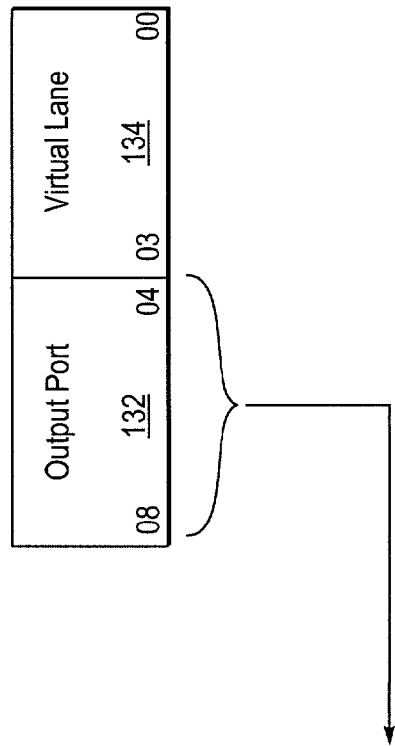
FIG. 10 illustrates an address map, according to an exemplary embodiment of the present invention, for the OP-VL HOQ timer table.

FIG. 10 illustrates an address map, according to an exemplary embodiment of the present invention, for the OP-VL HOQ timer table 230.

FIG. 8 also illustrates that the memory 202 maintains first and second head-of-queue (HOQ) reference time arrays 232 and 234. The first HOQ reference time array 232 maintains a scaled time value for head-of-queue timers. In one embodiment, the scaling of the time values may be such that time is noted in units of one-half of a nominal head-of-queue lifetime limit (HLL), which is independently programmable for each of the communications port 24 associated with a datapath 20. The array 232 is indexed with an encoded, 5-bit output port number. Each entry within the array 232, in one embodiment, stores (1) a 7-bit a current time value (e.g., a measure of time in one-half of the HLL) and (2) a 5-bit head-of-queue lifetime limit (HLL). The arbiter 36 periodically (e.g., after a predetermined number of core clock cycles), steps through the array 232 to determine whether the current time value for each entry should be updated depending on the HLL value and a master cycle counter (not shown) of the arbiter 36. Each update of a current time value in the array 232 causes a concurrent update of a corresponding time value in the second HOQ reference time array 234.

Dealing now more specifically with the second HOQ reference time array 234, this array 234 holds a current-time value for each output communications port 24 associated with the datapath 20. The current-time values within the array 234 are utilized for setting head-of-queue arrival times, and for comparison against head-of-queue arrival times to detect timeout conditions, as will be described in further detail below. A different reference time is provided for each output communications port 24 because HOQ lifetimes are programmable on a per port basis. The array 234 is again indexed by an encoded, 5-bit output port number.

At a high level, where time values are scaled according to a head-of-queue lifetime limit (HLL), the detection of a timer condition, by comparison of a head-of-queue or switch arrival time against the current time, may be detected if:

(Current time−arrival time)≧2.

One way to perform this determination would be to perform a two-stage operation, namely a first subtraction operation followed serially by a second comparison operation. The present invention proposes an alternative manner in which, for example, the above detection timeout condition may be performed as a single-stage operation.

Detection of Timeout Condition-Methodology

Figure 11:
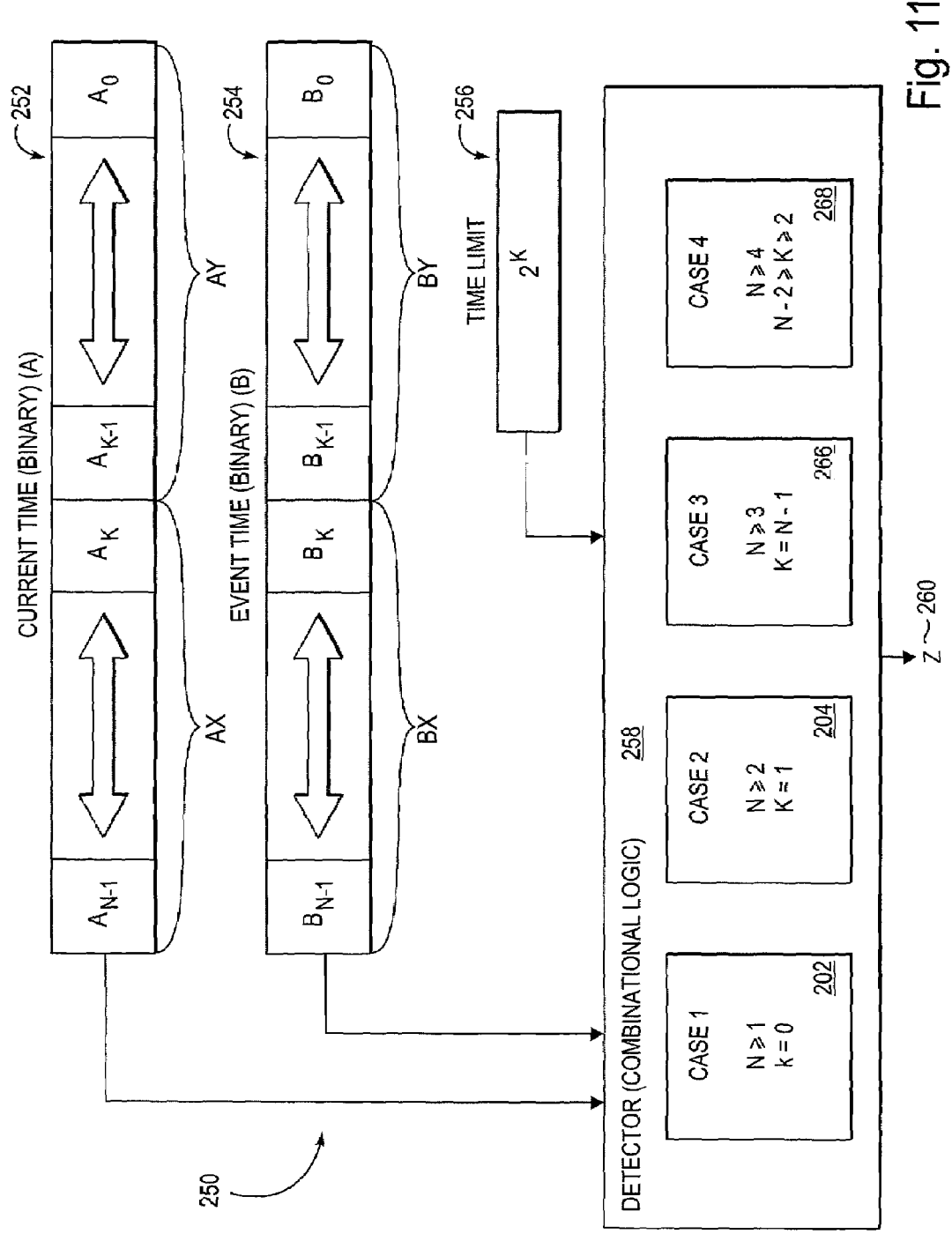
FIG. 11 is a diagrammatic representation of a method, according to an exemplary embodiment of the present invention, to detect a timeout condition pertaining to a data item (e.g., a transfer request) within a process (e.g., an arbitration process between competing requests).

FIG. 11 is a diagrammatic representation of a method 250, according to an exemplary embodiment of the present invention, to detect a timeout condition pertaining to a data item (e.g., a transfer request) within a process (e.g., an arbitration process between competing requests). FIG. 11 illustrates the maintenance and storage of a current time 252 within a memory associated with the process (e.g., a random access memory (RAM) or register utilized by the arbitration process). In one embodiment, the current time 252 is maintained by a core clock within a device within which the process is being performed, and is latched and stored periodically within the memory for purposes of performing the method 250. The current time 252 is maintained as a N-bit binary number (A), and has an upper portion (AX), comprising bits $a_{n-1}$ through $a_k$ of the binary number (A), and a lower portion (AY), comprising bits $a_k$ through $a_0$, where K is a non-negative integer, less than N, and a logarithm base 2 of a time limit 256.

An event time 254 is also stored within the memory, and records the time of an occurrence of an event pertaining to the data item within the process. As with the current time 252, the event time 254 is stored as a N-bit binary number (B). The event time 254 also has an upper portion (BX) comprising bits $b_{n-1}$ through $b_k$, and a lower portion (BY), comprising bits $b_{k-1}$ through $b_0$.

Finally, a predetermined time limit 256 may, in one embodiment, be stored within the memory. The predetermined time limit 256 is again stored as a binary number, and is expressed as a non-negative integer K, where K is less than N and is a logarithm base 2 of a predetermined time limit value. In the alternative embodiment, the predetermined time limit 256 may be configured, or embodied, within combinational logic included within a detector 258. In this embodiment, the time limit 256 is not stored within the memory and is hardwired. Nonetheless, the term "configured" is intended to encompass both the storage of the time limit 256 within the memory, and the configuration of this time limit 256 within combinational logic of the detector 258.

The current time 252, the event time 254, and the predetermined time limit 256 all provide input into, or are embodied within, a detector 258 including combinational logic that operates to utilize these inputs to detect a timeout condition pertaining to the data item. In one embodiment the timeout condition is detected by determining that the difference between the current time 252 and the event time 254 exceeds the predetermined time limit 256. According to one embodiment, the detection of the timeout condition is performed utilizing a single-stage operation that is implemented within the combinational logic of the detector 258. Specifically, the combinational logic, in one embodiment, operates to compute a boolean value Z 260 where:

$z \leftarrow ((A-B) \text{ modulo } 2^n) \geq 2^K$;
and $n \geq 1$ and $n-1 \geq k \geq 0$.

If the boolean value Z 260, as outputted by the combinational logic is true (i.e., is set to a logical 1), this indicates that a timeout condition has occurred in that:

(current time(A)−event time(B))≥time limit.

Otherwise stated,
Where $Ax = A \text{ div } 2^k$; $Ay = A \text{ rem } 2^k$; $Bx = B \text{ div } 2^k$; $By = B \text{ rem } 2^k$
then (A−B) modulo $2^n \geq 2^k$ is true if ((Ax−Bx) modulo $2^{n-k} \geq 2$) |(Ax≠Bx)+̂(Ay<By)). (Ax−Bx) modulo $2^{n-k} \geq 2$ is true if the following is true for any pair of adjacent bits in Ax and Bx $(Ax[i] \hat{+} Bx[i] \hat{+} \overline{(Ax[i-1]} \bullet Bx[i-1])$ As stated above, the combinational logic of the detector 258 implements the computation of (A−B) modulo $2^n \geq 2^k$ to generate the boolean value Z 260. In an alternative representation, four cases (or computations) may be implemented within the combinational logic, namely cases 262–268 as illustrated in FIG. 11. In this representation, the current time (A) 252 and the event time (B) 254 may each be represented, as described in FIG. 11, as a string of binary digits $a_i$ and $b_i$, respectively, where $n-1 \geq i \geq 0$ as shown below:

$A = a_{n-1} \, a_{n-2} \, a_{n-3} \ldots a_i \ldots a_2 \, a_1 \, a_0$.
$B = b_{n-1} \, b_{n-2} \, b_{n-3} \ldots b_i \ldots b_2 \, b_1 \, b_0$.

Relational expressions that use the operators ">", "≥", "<", "≤", "=" and "≠" produce a boolean result.
For $n \geq 1$ and k=0, (case 1)
$z \leftarrow (A \neq B)$;
For $n \geq 2$ and k=1, (case 2)
$z \leftarrow ((a_{n-1} \hat{+} b_{n-1}) \hat{+} (\overline{a}_{n-2} \cdot b_{n-2}))$
$|((a_{n-2} \hat{+} b_{n-2}) \hat{+} (\overline{a}_{n-3} \cdot b_{n-3}))$
$|((a_{n-3} \hat{+} b_{n-3}) \hat{+} (\overline{a}_{n-4} \cdot b_{n-4}))$
:
$|(a_i \hat{+} b_i) \hat{+} (\overline{a}_{i-1} \cdot b_{i-1}))$
$|((a_3 \hat{+} b_3) \hat{+} (\overline{a}_2 \cdot b_2))$
$|((a_2 \hat{+} b_2) \hat{+} (\overline{a}_0 \cdot b_1))$
$|((a_1 \hat{+} b_1) \hat{+} (\overline{a}_0 \cdot b_0))$;
For $n \geq 3$ and k=n−1, (case 3)
$z \leftarrow (a_{n-1} \hat{+} b_{n-1}) \hat{+} (A[n-2 \ldots 0] < B[n-2 \ldots 0])$;
For $n \geq 4$ and $n-2 \geq k \geq 2$, (case 4)
$z \leftarrow ((A[n-1 \ldots k] - B[n-1 \ldots k]) \text{ modulo } 2^{n-k}) \geq 2)$
$|((A[n-1 \ldots k] \neq B[n-1 \ldots k]) \hat{+} (A[k-1 \ldots 0] < B[k-1 \ldots 0]))$;

The expression "((A[n−1 ... k]−B[n−1 ... k]) modulo $2^{n-k}) \geq 2$" is of the general form of the original problem and fits the case where $n \geq 2$ and k−1. Thus, the equation for the $n \geq 4$ and $n-2 \geq k \geq 2$ (case 4) can be expanded as:

$z \leftarrow ((a_{n-1} \hat{+} b_{n-1}) \hat{+} (\overline{a}_{n-2} \cdot b_{n-2}))$
$|((a_{n-2} \hat{+} b_{n-2}) \hat{+} (\overline{a}_{n-3} \cdot b_{n-3}))$
$|((a_{k+2} \hat{+} b_{k+2}) \hat{+} (\overline{a}_{k+1} \cdot b_{k+1}))$
$|((a_{k+1} \hat{+} b_{k+1}) \hat{+} (\overline{a}_k \cdot b_k))$
$|((A[n-1 \ldots k] \neq B[n-1 \ldots k]) \hat{+} (A[k-1 \ldots 0] < B[k-1 \ldots 0]))$;

The computation of the Boolean value Z 260, utilizing modulo $2^n$ is advantageous in that it takes into account a wrap-around event. Considered that, to reduce costs in one embodiment of the invention, a timer may be implemented having a limited, repeating cycle. Any duration that is less than the timer cycle can be measured with the timer. The use of modulo $2^n$ enables the start time to be subtracted from the end time modulo the cycle time.

It will thus be appreciated that the computation of (A−B) modulo $2^n \geq 2^k$ is advantageous in that the subtraction and comparison operations involved in (1) subtracting the event time (B) from the current time (A) and (2) the comparison to determine whether this difference exceeds the time limit 256, are performed in a single step which has the time complexity of either the subtraction or comparison operation, were these operations to be performed alone. More specifically, consider that the subtraction of two N-bit numbers is an O ($\log_2 n$) (or "order log-base-2 of n") time complexity operation. Relational operations (e.g., greater-than or equal-to operations) are also O ($\log_2 n$) time complexity operations. Accordingly, performing the subtraction and comparison operations in series is an O ($2 * \log_2 n$) time complexity operation. The computation described above to generate the Boolean value Z 260, on the other hand, is an O ($\log_2 n$) time complexity operation, which is in effect half the time complexity of doing sequential subtraction and comparison operations. Accordingly, the present invention allows for the detection of a transgression of a time limit utilizing a single operation that is efficient from a time complexity perspective. Where a large number of timeout detection operations are being performed within a process, it will be appreciated that the cumulative time saving presented by the present invention may be relatively substantial. Further, a single operation can also be performed at higher frequencies, which produces a performance advantage.

Detection of Timeout Condition—Exemplary Implementation

While a general case of the present invention has been described above with reference to FIG. 11, an exemplary implementation within the context of the arbiter 36, described above, is now provided.

At a high level, the exemplary implementation within the arbiter 36 provides two timeout conditions, namely (1) a switch lifetime timeout condition and (2) a head-of-queue (HOQ) lifetime timeout condition. The switch lifetime timeout condition operates by recording the time at which an incoming, modified request 42 arrives at the resource allocator 40 from the request preprocessor 38 of the arbiter 36. This arrival time (an example of an event time) is checked against a current time whenever the relevant request 42 is processed. If the difference between the current time and the arrival time exceeds a specified switch lifetime limit (an example of a time limit 256), the relevant request 42 is discarded.

Dealing now with a HOQ lifetime timeout condition, when a request 42 arrives at the head of a particular queue (e.g., an OP-VL request queue 170), the arrival time at the head of the queue is recorded. On a periodic basis, this arrival time is subtracted from a current time, and the difference compared against a HOQ lifetime limit (HLL). If the difference exceeds the HOQ lifetime limit, the relevant request 42 is discarded from the queue.

It will be appreciated that the switch lifetime timeout and head-of-queue lifetime timeout conditions described above are advantageous in that they avoid deadlock and provide a degree of congestion management within the arbiter 36.

Figure 12:
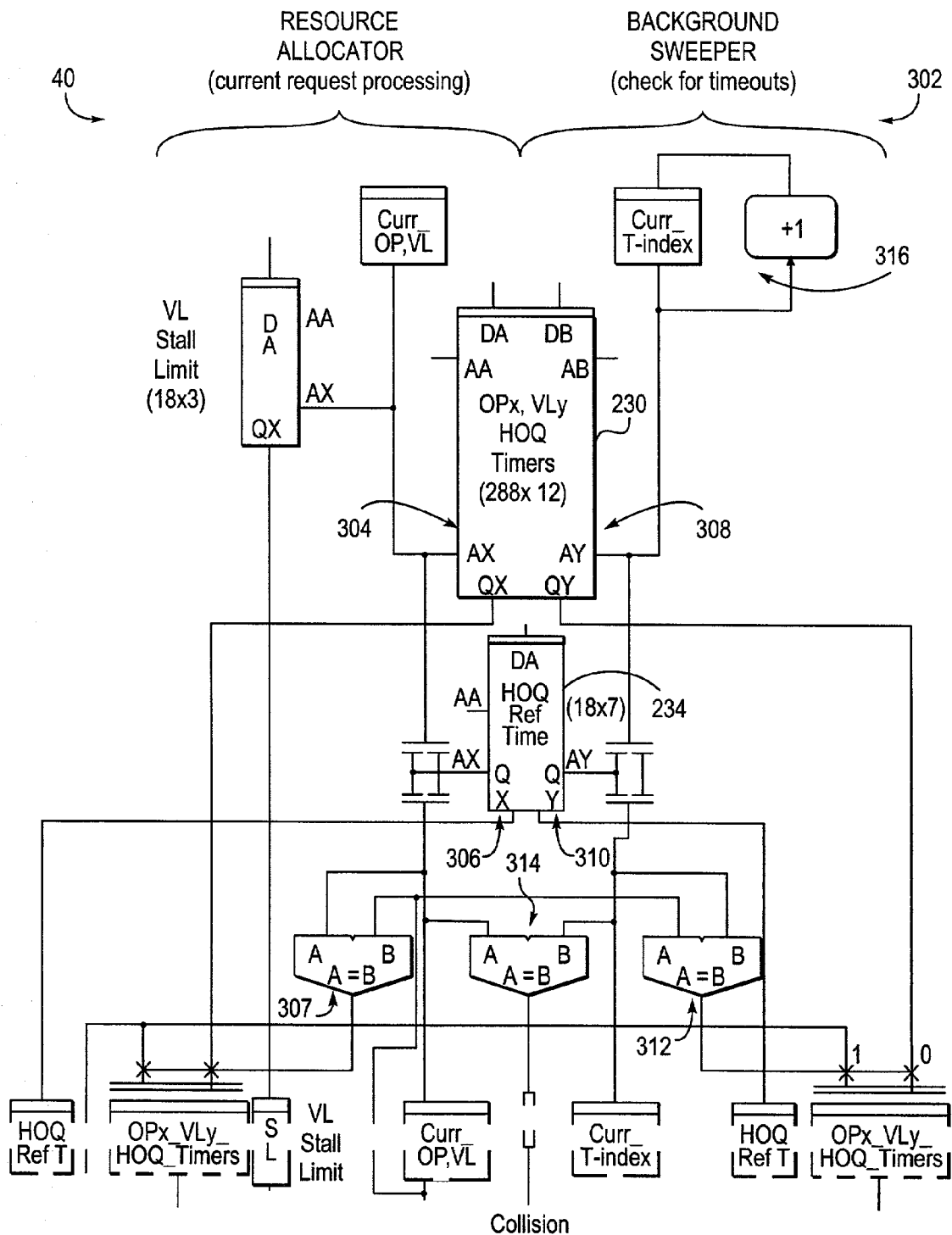
FIGS. 12 and 13 are pipestage diagrams providing further details regarding an exemplary method of detecting a timeout condition for a request within the resource allocator of an arbiter.
Figure 13:
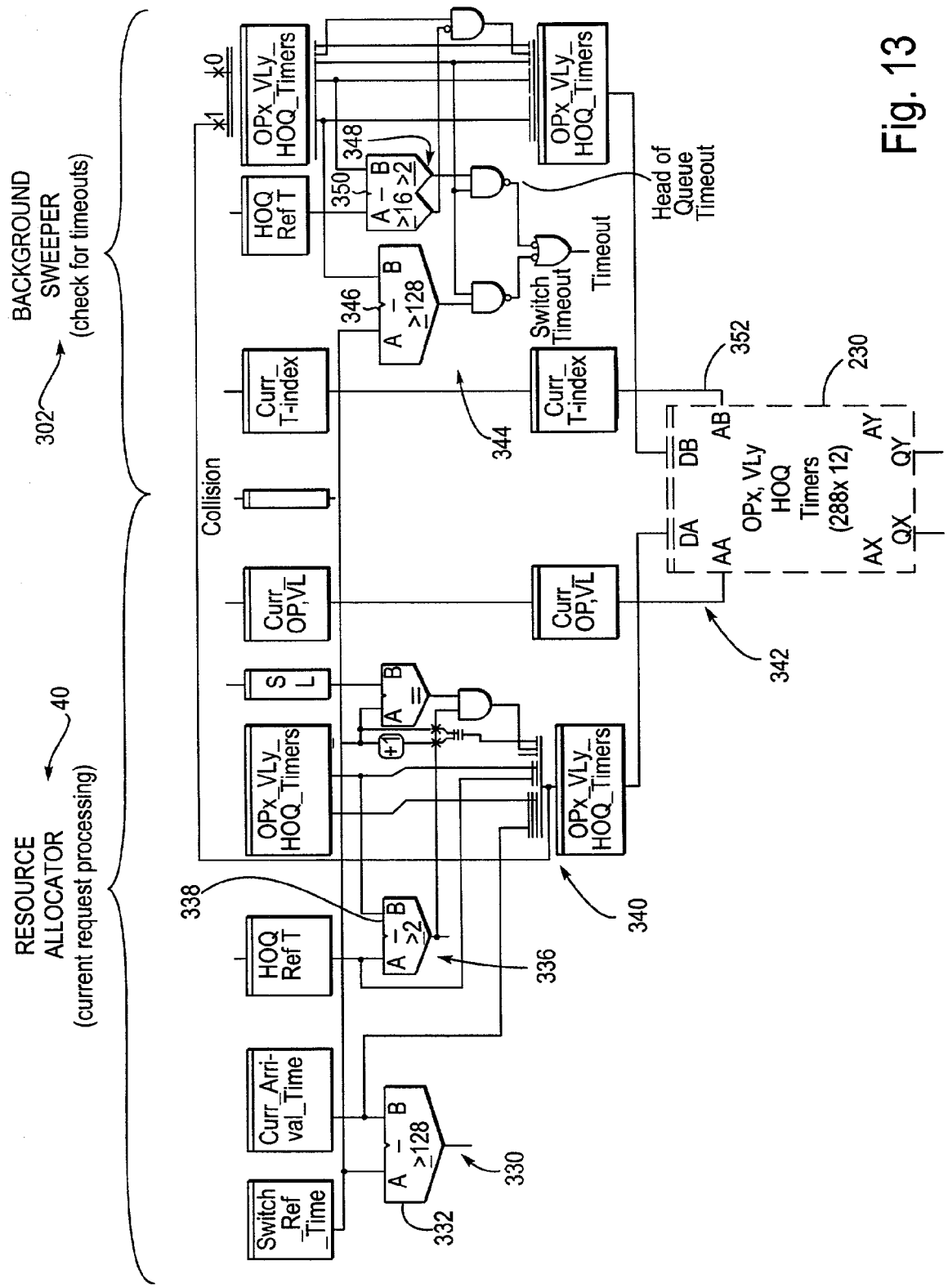

FIG. 12 and FIG. 13 are pipestage diagrams providing further details regarding an exemplary method of detecting timeout conditions (e.g., a switch lifetime timeout condition and a HOQ lifetime timeout condition) for a request within the resource allocator 40 of an arbiter 36. It will be appreciated from the above discussion that there are two timers for a request 42 at the head of each OP-VL request queue 170. Specifically, a request 42 at the head of a queue 170 will be subject to a "switch lifetime timer" and a "head-of-queue (HOQ) lifetime timer". These "timers", as described above, are implemented utilizing information stored OP-VL HOQ timer table 230, illustrated in FIG. 8, and the pending request buffer 204. As described, the present invention (as opposed to initiating a specific timer with respect to each request 42 received at the resource allocator 40) causes the arbiter 36 to save an arrival time of an incoming request 42 at the resource allocator 40 or at the head of a queue 170, these arrival times then being compared against a current time to detect a timeout condition. This approach is advantageous over the approach of maintaining an individual timer for each incoming request 42 as the maintenance of individual timers is resource and operationally expensive.

As also described above with reference to FIG. 8, the memory 202 of the arbiter 36 maintains first and second HOQ reference time arrays 232 and 234. By having two arrays 232 and 234, concurrent operations as described below are facilitated. The first of the two operations is the processing of a request 42 by the resource allocator 40. As stated above, a head-of-queue timer value, as stored within the OP-VL HOQ timer table 230 is only relevant if the current request 42 is at the head of a particular OP-VL request queue 170. The second operation is a background sweep by a background sweeper 302 of timers for timeout and stall conditions. Timeout processing requires, in the exemplary embodiment, two pipestages, a first of the pipestages being described with reference to the pipestage diagram shown in FIG. 12, and the second pipestage being described with respect to the pipestage diagram shown in FIG. 13.

In an alternative embodiment, a single HOQ reference time array is used, and sweeps are interleaved with normal request processing in the resource allocator 40. In this embodiment, the HOQ arrival time is stored in the OP-VL management table 208. As noted above, HOQ timeout checks may be done every time a request from an OP-VL request queue 172 is processed by the resource allocator 40. In one exemplary embodiment, every 256 clock cycles, one OP-VL combination is scheduled for a timeout check of the request at the head of the queue 170. In the event of a HOQ lifetime timeout, the head request is discarded by issuing an error grant. If a switch lifetime timeout is detected, the head request is discarded and a timeout check of the next queued request is scheduled to occur at the soonest opportunity.

FIG. 12 illustrates the concurrent operations performed by the resource allocator 40, in the context of processing the current request 42, and the background sweeper 302, in the context of checking for timeout conditions. As indicated at 304, the resource allocator 40 reads a head-of-queue (HOQ) arrival time for a current request 42 from the OP-VL HOQ timer table 230 using the output port, virtual lane combination for the current request 42 as an index.

As indicated at 306, the resource allocator 40 then reads a current reference time from the second HOQ reference time array 234, utilizing an output port of the current request 42 as an index.

At 307, a check is performed to determine whether the resource allocator 40 is accessing the same entry within the OP-VL HOQ timer table 230 that it accessed in the immediately previous cycle. If so, the updated entry within the OP-VL HOQ timer table 230 is bypassed.

Turning now to the background sweeper 302, as indicated at 308, the background sweeper 302 reads an entry from the OP-VL HOQ timer table 230, potentially in parallel with a read performed by the resource allocator 40. At 310, the background sweeper 302 then reads a corresponding reference time from the second HOQ reference time array 234. At 312, a check is performed to determine whether the background sweeper 302 is accessing the same OP-VL HOQ timer table entry as was accessed by the resource allocator 40 in the previous cycle. If so, the updated entry from the subsequent pipestage (to be described with reference to FIG. 13) is bypassed.

At 314, the OP-VL HOQ timer table indexes are compared to determine whether the resource allocator 40 and the background sweeper 302 are concurrently reading a common entry within the OP-VL HOQ timer table 230. If so, a "collision" flag is set for use in the immediately subsequent pipestage.

As indicated at 316, the background sweeper 302 does a continuous, sequential scan of entries within the OP-VL HOQ timer table 230, checking for timeouts.

FIG. 13 is a pipestage diagram illustrating a second pipestage of an exemplary implementation of a method, according to an exemplary embodiment of the present invention, of detecting a timeout condition for requests within the arbiter 36.

It should be noted that the resolution of the switch lifetime timers and the head-of-queue lifetime timers are different. Specifically, the switch lifetime timers have a very fine resolution (e.g., $1/256^{th}$ of their lifetime limit). In contrast, the head-of-queue timers, in the exemplary implementation, have a very course resolution (e.g., ½ of their lifetime limits).

FIG. 13 again illustrates pipestage operations that are performed by the resource allocator 40 and by the background sweeper 302. Dealing first with operations performed by the resource allocator 40 in the processing of a request 42, at 330 the resource allocator 40 checks the current request 42 for a switch lifetime timeout. Specifically, a detector 332 operates to subtract the 12-bit switch arrival time associated with the current request 42 from the 12-bit switch reference time, modulo 4096. The difference resulting from this subtraction operation is the compared to the switch lifetime limit (e.g., 128 time units). If the difference is greater than, or equal to the switch lifetime limit, a switch lifetime timeout condition is detected with respect to the current request.

According to the present invention, the detector 332 operates to detect the switch lifetime timer condition by computing (A–B) modulo $2^n \geq 2^k$, where n=12 and k=7 as described above in order to achieve the described advantages.

It should also be noted that, when checking for a switch lifetime timeout condition at 330, the resource allocator 40 does not use the switch arrival time value for the current request 42. This is because the current request 42 may not be at the head of an OP-VL request queue 170 and an entry for the current request 42 may accordingly not exist in the OP-VL HOQ timer table 230. Nonetheless, the resource allocator 40 is required to do a timeout check, and accordingly utilizes a switch arrival time 228, as stored within an entry for the current request 42, within the pending request buffer 204. The storage of the switch arrival time 228 within the pending request buffer 204 is illustrated in FIG. 9.

At 336, the resource allocator 40 checks the current request 42 for a head-of-queue (HOQ) lifetime timeout condition. Specifically, a detector 338 operates to, firstly, subtract a 7-bit head-of-queue arrival time for the current request from a 7-bit head-of-queue reference time, modulo 128. The difference rendered by this subtraction operation is then compared to a HOQ lifetime limit (HLL) (e.g. 2 time units) and, if the difference is greater than the HLL, a HOQ lifetime timeout condition is detected.

As with the detector 332, the detector 338 may compute (A–B) modulo $2^n \geq 2^k$ where n=7 and k=1 to detect the HOQ lifetime timeout condition.

As indicated at 340, an updated entry within the OP-VL HOQ timer table 230 is bypassed to the start of the pipestage illustrated in FIG. 13 if either the resource allocator 40 or the background sweeper 302 accessed the same entry within the table 230 during a current clock cycle.

As indicated at 342, the resource allocator 40 then writes an updated entry into the OP-VL HOQ timer table 230.

Moving onto operations performed by the background sweeper 302, at 344, the background sweeper 302 checks for a switch lifetime timeout condition. Specifically, if an arrival time valid bit for the current request 42 is set within the OP-VL HOQ timer table 230, the 12-bit switch arrival time, as recorded within OP-VL HOQ timer table 230, is subtracted from a 12-bit switch reference time, modulo 4096 by a detector 346. If the difference that results from this subtraction operation is greater than, or equal to, a switch lifetime limit (e.g., 128 time units) a switch lifetime timeout condition is detected.

Again, the detector 346 may operate to compute (A–B) modulo $2^n \geq 2^k$ where n=12 and k=7.

At 348, utilizing detector 350, the background sweeper 302 performs a check for a head-of-queue (HOQ) lifetime timeout condition. If an arrival time valid bit for the current request 42 for an entry within the OP-VL HOQ timer table 230 is set within, for the entry under consideration, the 7-bit HOQ arrival time, as stored within the entry of the table 230, is subtracted from an 7-bit HOQ reference time, modulo 128. If the difference generated by this subtraction operation is greater than, or equal to, a predetermined head-of-queue lifetime limit (HLL) (e.g., 2 time units), a head-of-queue lifetime timeout condition is detected.

Again, the detector 350 may operate to computer (A–B) modulo $2^n \geq 2^k$ where n=7 and k=1 in order to detect the head-of-queue lifetime timeout condition at 348.

Moving on to 352, the background sweeper 302 then proceeds to write an updated entry into the OP-VL HOQ timer table 230. In one embodiment, the switch reference time and the HOQ reference times are selected bit ranges from a free running counter called the "Arbiter Time Base". The Arbiter Time Base is 37 bits wide, while the switch reference time is 12 bits wide and the HOQ reference time is 7 bits wide.

The switch lifetime limits and the HOQ lifetime limits are used to select their associated reference times from the Arbiter Time Base. The switch lifetime limit is stored in a register and the HOQ lifetime limits are stored in a small register file with one entry per output port. All of the limits are programmable values which are set by the Subnet Manager.

The Arbiter Time Base increments every clock cycle. Conveniently, the switch lifetime limit and the HOQ lifetime limits are power-of-two multiples of 1024 clock cycles. Each is specified by a 5-bit lifetime parameter. A lifetime parameter value of zero means a nominal lifetime limit of 1024 cycles. A parameter value of 1 means a lifetime limit of 2048 cycles. A value of 2 means a limit of 4096 cycles, and so on. A parameter value of 20-or-more is interpreted as no (i.e. an infinite) lifetime limit.

The right-most bit of each reference time selected from the Arbiter Time Base is equal to the respective timer's resolution. For example, say a switch lifetime parameter is 4 which means the switch lifetime limits is 16,384 (=1024*(24)) cycles. Given that the switch lifetime timer resolution is 1/256 of the switch outcome limit or 64 cycles in this case, bit 6 of the Arbiter Time Base is the low order bit of the switch reference times. Hence, in this example, the 16-bit switch reference times spans bits 21 through 6** of the Arbiter Time Base.

In comparison, say a HOQ lifetime parameter for output port 1 is also 4. Likewise, the HOQ lifetime limit is 16,384 cycles. However, the HOQ timers' resolution is ½ of the HOQ lifetime limit or 8192 cycles in this case. Hence, bit 13 of the Arbiter Time Base is the low order bit of this HOQ reference time. Then the 7-bit HOQ reference time spans bits 21 through 13 of the Arbiter Time Base.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and system to detect a timeout condition for a data item within a process have been described. Although the present invention has been described with reference to specific exemplary embodiments, it will be evident that various modifications and changes may be made to these embodiments without departing from the broader scope and spirit of the current invention.

What is claimed is:

1. A method to detect a timeout condition for a data item within the process, the method including:
   maintaining a current time as a first N-bit binary number (A);
   recording an event time of an occurrence of an event pertaining to the data item within the process, and storing the event time as a second N-bit binary number (B);
   configuring a predetermined time limit expressed as a non-negative integer K, where K is less than N and K is a logarithm base 2 of the predetermined time limit; and
   detecting a timeout condition pertaining to the data item when a difference between the current time and the event time exceeds the predetermined time limit,
   wherein the detection of the timeout condition is performed as a single-stage operation.

2. The method of claim 1 wherein the single-stage operation is a single $O(\log_2 n)$ computation.

3. The method of claim 1 wherein the single-stage operation is performed as a single combinatorial operation.

4. The method of claim 1 wherein, if $N>=1$ and $K=0$, the timeout condition is detected if a positive Boolean value results from a first computation (A#B).

5. The method of claim 1 wherein, if $N>=2$ and $K=1$, the timeout condition is detected if a positive Boolean value z results from a second computation:
   Where:
   $A = a_{n-1}\ a_{n-2}\ a_{n-3}\ \ldots\ a_i\ \ldots\ a_2\ a_1\ a_0$.
   $B = b_{n-1}\ b_{n-2}\ b_{n-3}\ \ldots\ b_i\ \ldots\ b_2\ b_1\ b_0$; and
   $z \leftarrow ((a_{n-1} \hat{+} b_{n-1}) \hat{+} (\overline{\alpha}_{n-2} \cdot b_{n-2}))$
   $|((a_{n-2} \hat{+} b_{n-2}) \hat{+} (\overline{\alpha}_{n-3} \cdot b_{n-3}))$
   $((a_{n-3} \hat{+} b_{n-3}) \hat{+} (\overline{\alpha}_{n-4} \cdot b_{n-4}))$
   :
   $|((a_i \hat{+} b_i) \hat{+} (\overline{\alpha}_{i-1} \cdot b_{i-1}))$
   :
   $|((a_3 \hat{+} b_3) \hat{+} (\overline{\alpha}_2 \cdot b_2))$
   $|((a_2 \hat{+} b_2) \hat{+} (\overline{\alpha}_1 \cdot b_1))$
   $|((a_1 \hat{+} b_1) \hat{+} (\overline{\alpha}_0 \cdot b_0))$.

6. The method of claim 1 wherein, if $N>=3$ and $K=N-1$, the timeout condition is detected if a positive Boolean value z results from a third computation:
   Where:
   $A = a_{n-1}\ a_{n-2}\ a_{n-3}\ \ldots\ a_i\ \ldots\ a_2\ a_1\ a_0$.
   $B = b_{n-1}\ b_{n-2}\ b_{n-3}\ \ldots\ b_i\ \ldots\ b_2\ b_1\ b_0$; and
   $z \leftarrow (a_{n-1} \hat{+} b_{n-1}) + (A[n-2 \ldots 0] < B[n-2 \ldots 0])$.

7. The method of claim 1 wherein, if $N>=4$ and $N-2>=K>=1$, the timeout condition is detected if a positive Boolean value z results from a fourth computation:
   Where:
   $A = a_{n-1}\ a_{n-2}\ a_{n-3}\ \ldots\ a_i\ \ldots\ a_2\ a_1\ a_0$.
   $B = b_{n-1}\ b_{n-2}\ b_{n-3}\ \ldots\ b_i\ \ldots\ b_2\ b_1\ b_0$, and
   $z \leftarrow (((A[n-1 \ldots k] - B[n-1 \ldots k])\ \text{modulo}\ 2^{n-k}) \geq 2)$
   $|((A[n-1 \ldots k] \neq B[n-1 \ldots k]) \hat{+} (A[k-1 \ldots 0]))$.

8. The method of claim 1 wherein the data item comprises a resource request, the process comprises an arbitration process between competing requests.

9. The method of claim 8 wherein the event comprises an arrival of the resource request at an interconnect device, and the event time comprises an interconnect device arrival time of the arrival of the resource request at the interconnect device.

10. The method of claim 9 wherein the event comprises an arrival of the resource request at a resource allocator of an arbiter for the interconnect device, and the event time comprises an allocator arrival time of the arrival of the resource request at the resource allocator.

11. The method of claim 8 wherein the event comprises an arrival of the resource request at the head of a queue within the arbitration process, and the event time comprises a head-of-queue arrival time.

12. A system to detect a timeout condition for a data item within the process, the system including:
    a memory to store a current time as a first N-bit binary number (A) and to store an event time as a second N-bit binary number (B), the event time being of the time of an occurrence of an event pertaining to the data item within the process, and
    a detector to detect a timeout condition pertaining to the data item when a difference between the current time and the event time exceeds a predetermined time limit,
    wherein the predetermined time limit is expressed as a non-negative integer K, where K is less than N and K is a logarithm base 2 of the predetermined time limit, and wherein the detection of the timeout condition is performed as a single-stage operation.

13. The system of claim 12 wherein the single-stage operation is a single $O(\log_2 n)$ computation.

14. The system of claim 12 wherein the detect the comprises combination logic, and wherein the single-stage operation is performed as a single combinatorial operation.

15. The system of claim 12 wherein, if $N>=1$ and $K=0$, the timeout condition is detected if a positive Boolean value results from a first computation ($A \neq B$).

16. The system of claim 12 wherein, if $N>=2$ and $K=1$, the timeout condition is detected if a positive Boolean value results from a second computation:
    Where:
    $A = a_{n-1}\ a_{n-2}\ a_{n-3}\ \ldots\ a_i\ \ldots\ a_2\ a_1\ a_0$.
    $B = b_{n-1}\ b_{n-2}\ b_{n-3}\ \ldots\ b_i\ \ldots\ b_2\ b_1\ b_0$; and
    $z \leftarrow (a_{n-1} \hat{+} b_{n-1}) \hat{+} (\overline{\alpha}_{n-2} \cdot b_{n-2}))$
    $((an_{n-2} \hat{+} b_{n-2}) \hat{+} (\overline{\alpha}_{n-3} \cdot b_{n-3}))$
    $((a_{n'} \hat{+} b_{n-3}) \hat{+} (\overline{\alpha}_{n-4} \cdot b_{n-4}))$
    :
    $|((a_i \hat{+} b_i) \hat{+} (\overline{\alpha}_{i-1}\ b_{i-1}))$
    :
    $|(a_3 \hat{+} b_3) \hat{+} (\overline{\alpha}_2 \cdot b_2))$
    $|((a_2 \hat{+} b_2) \hat{+} (\overline{\alpha}_1 \cdot b_1))$
    $|((a_2 \hat{+} b_2) \hat{+} (\overline{\alpha}_0 \cdot b_0))$.

17. The system of claim 12 wherein, if $N>=3$ and $K=N-1$, the timeout condition is detected if a positive Boolean value results from a third computation:
    Where:
    $A = a_{n-1}\ a_{n-2}\ a_{n-3}\ \ldots\ a_i\ \ldots\ a_2\ a_1\ a_0$.
    $B = b_{n-1}\ b_{n-2}\ b_{n-3}\ \ldots\ b_i\ \ldots\ b_2\ b_1\ b_0$; and
    $z \leftarrow (a_{n-1} \hat{+} b_{n-1}) + (A[n-2 \ldots 0] < B[n-2 \ldots 0])$.

18. The system of claim 12 wherein, if $N>=4$ and $N-2>=K>=1$, the timeout condition is detected if a positive Boolean value results from a fourth computation:

Where:

$A = a_{n-1} \, a_{n-2} \, a_{n-3} \ldots a_i \ldots a_2 \, a_1 \, a_0$.

$B = b_{n-1} \, b_{n-2} \, b_{n-3} \ldots b_i \ldots b_2 \, b_1 \, b_0$; and $z \leftarrow (((A[n-1 \ldots k] - B[n-1 \ldots k]) \text{ modulo } 2^{n-k}) \geq 2)$
$| ((A[n-1 \ldots k] \neq B[n-1 \ldots k]) \dotplus (A[k-1 \ldots 0] < B[k-1 \ldots 0]))$.

19. The system of claim 12 wherein the data item comprises a resource request, the process comprises an arbitration process between competing requests, and the memory and detector are associated with an arbiter that performs the arbitration process.

20. The system of claim 19 wherein the event comprises an arrival of the resource request at an interconnect device, and the event time comprises an interconnect device arrival time of the arrival of the resource request at the interconnect device.

21. The system of claim 20 wherein the event comprises an arrival of the resource request at a resource allocator of an arbiter for the interconnect device, and the event time comprises an allocator arrival time of the arrival of the resource request at the resource allocator.

22. The system of claim 19 wherein the event comprises an arrival of the resource request at the head of a queue within the arbitration process, and the event time comprises a head-of-queue arrival time.

23. Apparatus to detect a timeout condition for a data item within the process, the system including:

first means for storing a current time as a first N-bit binary number (A) and for storing an event time as a second N-bit binary number (B), the event time being of the time of an occurrence of an event pertaining to the data item within the process, and second means for detecting a timeout condition pertaining to the data item when a difference between the current time and the event time exceeds a predetermined time limit, wherein the predetermined time limit is expressed as a non-negative integer K, where K is less than N and K is a logarithm base 2 of the predetermined time limit, and wherein the detection of the timeout condition is performed as a single-stage operation.

24. A machine-readable medium storing a description of a circuit, said circuit comprising:

a memory to store a current time as a first N-bit binary number (A) and to store an event time as a second N-bit binary number (B), the event time being of the time of an occurrence of an event pertaining to the data item within the process, and a detector to detect a timeout condition pertaining to the data item when a difference between the current time and the event time exceeds a predetermined time limit, wherein the predetermined time limit is expressed as a non-negative integer K, where K is less than N and K is a logarithm base 2 of the predetermined time limit, and wherein the detection of the timeout condition is performed as a single-stage operation.

25. The machine-readable medium of claim 24 wherein the description comprises a behavioral level description of the circuit.

26. The machine-readable medium of claim 25 wherein the behavioral level description is compatible with a VHDL format.

27. The machine-readable medium of claim 25 wherein the behavioral level description is compatible with a Verilog format.

28. The machine-readable medium of claim 24 wherein the description comprises a register transfer level netlist.

29. The machine-readable medium of claim 24 wherein the description comprises a transistor level netlist.

* * * * *